April 9, 1968    J. P. FORSYTH ET AL    3,376,586
CONVERTIBLE HOUSING STRUCTURE
Filed May 12, 1967
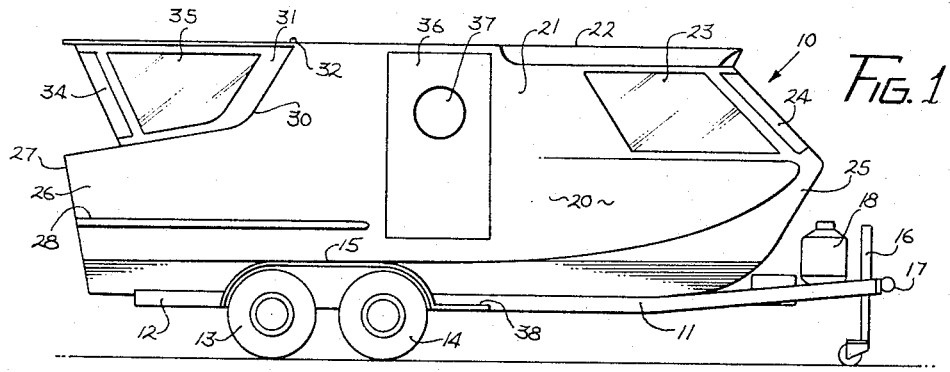
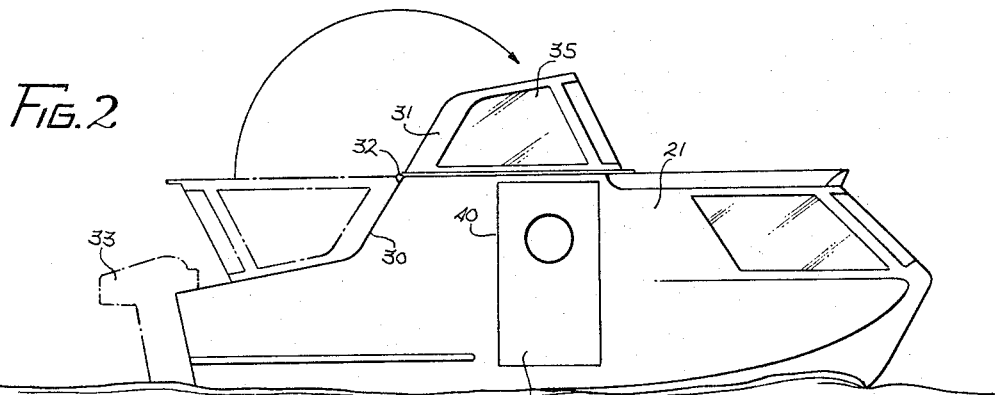
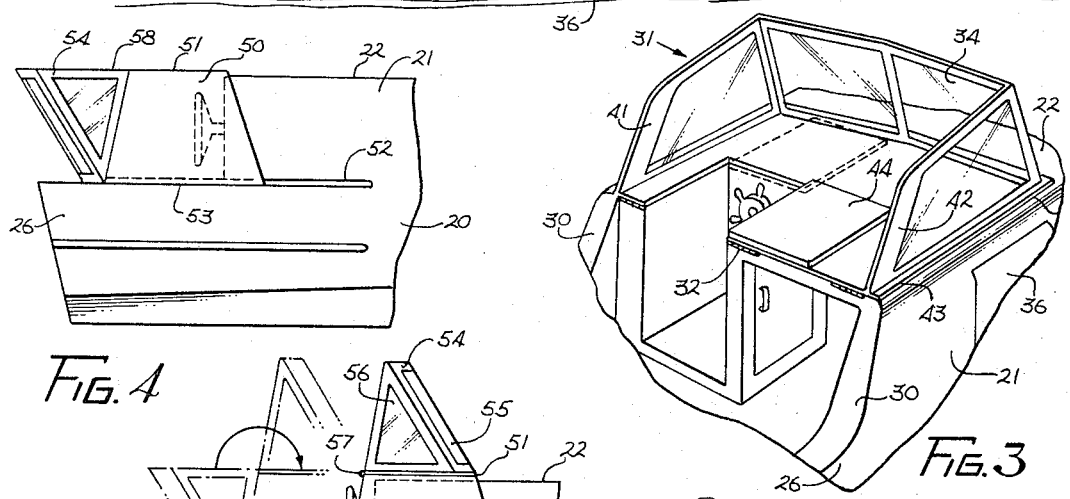
ROBERT W. FORSYTH
JOHN P. FORSYTH
INVENTOR.
BY
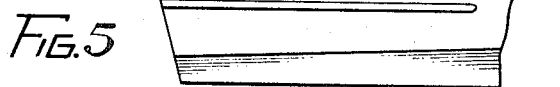

United States Patent Office 3,376,586
Patented Apr. 9, 1968

3,376,586
CONVERTIBLE HOUSING STRUCTURE
John P. Forsyth and Robert W. Forsyth, both of
1517 N. 3rd Ave., Upland, Calif. 91786
Filed May 12, 1967, Ser. No. 637,980
13 Claims. (Cl. 9—1)

ABSTRACT OF THE DISCLOSURE

A housing structure is disclosed herein having a hull, a cabin and an open cockpit adapted to be utilized as a boat in normal running operation with the cockpit open, utilized as living quarters with the cockpit enclosed, or utilized as mobile living quarters on land with the cockpit enclosed in combination as an assemblage with a roadable trailer. To achieve the convertible feature to permit changing of the structure to its variety of configurations, a movable flying bridge is provided which is pivotally mounted on the roof of the cabin so as to be readily rotated rearwardly to a first position resting on the hull sides of the boat to enclose the open cockpit or allowed to rest in a second position on the cabin roof to project upwardly so as to serve as a windshield.

BACKGROUND OF THE INVENTION (1) *Field of the invention*

This invention relates to convertible housing structures and, more particularly, to a combined water vehicle and separable, roadable trailer assembly employable as a mobile living enclosure on land and adapted to be disassembled so that the water vehicle may be used as a water borne living enclosure or used in normal boating operations.

(2) *Description of the prior art*

Conventional small houseboats or water borne living enclosures are well known which may be transported on a light, boat trailer and which could conceivably be used as a mobile living enclosure on land when so mounted on the trailer. However, trailered houseboats suffer from the lack of provision for ingress and egress when the boat is mounted on the trailer should the houseboat be used on land as a mobile, living enclosure. Furthermore, adverse effects of high cross winds inducing instability in the trailered assembly makes transport extremely difficult because of the exceptionally high silhouette of the assembly when the houseboat is mounted on the trailer and moved about on land.

Other attempts have been made to provide convertible living structures which may take the form of a variety of amphibious vehicles and trailers. Common to this type is a vehicle incorporating the practice of having the trailer frame including wheels, permanently attached to the living enclosure/boat-hull so that the whole assembly may be water borne. Still other attempts have been made where the living-enclosure/boat-hull serves as the load carrying frame when the assembly is trailered on land, which incorporate permanently attached wheels, carried in the water whether in an extended position or in a retracted position. However, in amphibious trailer versions incorporating a permanently attached, partially exposed, wheeled trailer frame, excessively high drag results when the vehicle is water borne which requires either a high level of power for a given level of performance (with high fuel consumption) or especially poor performance and lack of control in the water. An additional disadvantage is the deep draft of the unit in the water caused by the protrusion of the wheels and frame, thus limiting operation to areas of relatively deep water. In versions where the living-enclosure/boat-hull serves as the load carrying frame when the unit is trailered and the wheels are directly attached to or recessed into the hull, drag in the water is somewhat reduced; however, there is encroachment on usable, interior living space in the unit arising from the inward projection of the wheel wells and there are problems involved in sealing the attachment fixtures for the wheels.

In other versions where the living-enclosure/boat-hull serves as the load carrying frame when the unit is trailered, and the wheels are so attached to the hull that the wheels may be fully retracted when the unit is in the water, drag in the water is substantially reduced. In this instance, the usable interior hull space is greatly restricted caused by the relatively deeply recessed wheel wells. The wheel retraction mechanism also adds complexity and, because of the moving parts, creates even greater problems in sealing to achieve a watertight condition.

In all existing types of amphibious trailers, there is a design conflict between provision of adequate space for enclosed personnel accommodations when the unit is used as a trailer on land and the provision of open deck space including a pilot's control station when the unit is used as a boat. This conflict is quite naturally resolved in favor of incorporating more interior, living space which results in a lack of adequate open deck space and a generally marginal location for boat controls.

SUMMARY OF THE INVENTION

Accordingly, the principal feature of the present invention is the provision of a movable flying bridge which, in the closed position, encloses an otherwise open cockpit so as to make the living-enclosure/boat-hull and trailer frame assembly comparable in every respect to the conventional travel trailer and, when the flying bridge is in its open or raised position with the living-enclosure/boat-hull separated from the trailer frame in the water, provides all the advantages, utility and appearance of a conventional pleasure boat.

The aforementioned problems and difficulties encountered with houseboat and amphibious trailers are obviated by the present invention which provides a single vehicle assembly comprising a living-enclosure/boat-hull unit and a wheeled, roadable trailer frame combined in a unit assemblage for use as a mobile living enclosure on land, and readily adapted to be disassembled into separable units so that the living-enclosure/boat-hull may be equipped with a power means and used as a pleasure boat on water.

The housing structure comprises a hull, an enclosed cabin, and an open cockpit leading to the cabin. The trailer frame unit is arranged so that the boat and trailer assemblage may be towed in the normal manner by a motor vehicle on land over roads and highways. The combined assemblage incorporates the equipment generally found on a conventional boat trailer, for example, easily disengaged attachment fixtures to secure the hull to the frame, a forward-mounted winch and cable and transverse rollers which support the hull and, together with the winch and cable, make it possible to move the hull longitudinally off and on to the trailer at a typical boat launching ramp.

The chief feature of the living-enclosure/boat-assemblage is the incorporation of a movable flying bridge. This bridge may be secured in a closed position, where it forms and completes the rear portion of the living enclosure by extending the roof line of the cabin over the open cockpit to the end of the assembly and provides lateral and rear windows for light and observation. Alternatively, the bridge may be secured in a forward extended position where it faces forward and projects upwardly from the roof line of the cabin to act as a windscreen, with the space at the aft end of the hull being open for use as a pilot's cockpit and open deck area.

Therefore, it is an object of the present invention to provide a novel housing structure including an assemblage composed of a living-enclosure/boat-hull and wheeled trailer frame which is adapted to be employed as a travel trailer and which includes a movable flying bridge having a closed position and an open position.

Another object of the present invention is to provide a housing structure wherein when the movable flying bridge is closed, ample space is provided for protected living accommodation and the assemblage offers a pleasing, trailer-like external appearance.

Another object of the present invention provides for a novel housing structure wherein when the flying bridge is closed, the assemblage is characterized by an exceptionally low silhouette which has the advantageous effect of reducing drag when the assemblage is trailered in its roadable configuration and which greatly mitigates the adverse effects of cross winds on roads and highways.

Another object of the present invention is to provide a living enclosure including a combined boat hull and trailer assemblage wherein the boat hull is modified to include a watertight, full size side door permitting ingress and egress to and from the interior of the hull with ease and accessibility as compared with a conventional travel trailer.

Still another object of the present invention is to provide a novel housing structure having a separable boat hull living enclosure and trailer frame wherein the boat hull is adapted to be water borne so as to be used as a pleasure boat and wherein with the movable flying bridge positionable on the roof of the cabin so that the cockpit is open, all the advantages of conventionally located boat controls and protection from wind and spray are realized.

Yet another object of the present invention is to provide a novel housing structure wherein when the flying bridge is moved to its second position, the cockpit area is enclosed so as to maintain the interior of the boat fully secured against intrusion and damage by either weather or unauthorized personnel.

A further object of the present invention is to provide a novel housing structure consisting of a boat hull and trailer assemblage which may be readily separated so that the boat may be water borne and wherein the hull therefor is a clean, unencumbered hull having no drag from wheels and trailer frame and adapted to provide true boat performance and handling with no waste of power or fuel normally required to obtain a given level of performance.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a side elevational view of the convertible housing structure of the present invention illustrated in its land transportable configuration as a boat trailer assemblage;

FIGURE 2 is a side elevational view of the convertible housing structure shown in FIGURE 1 illustrated in its water borne configuration separated from the travel trailer and illustrated with the movable flying bridge in its upright position in solid lines;

FIGURE 3 is a perspective view of the open cockpit pilot's station included in the boat of FIGURE 2;

FIGURE 4 is a fragmentary side elevational view of another version of the present invention showing the flying bridge pivotally carried on a sliding mount serving as a cockpit closure; and FIGURE 5 is a view similar to that shown in FIGURE 4 illustrating the flying bridge in its alternate positions.

DESCRIPTION OF THE PREFERRED EMBODIMENT

Referring to FIGURE 1, the novel convertible housing structure is illustrated in accordance with the present invention which comprises, in general, a water vehicle in the form of a seaworthy boat indicated by numeral 10 and a roadable trailer 11 on which the boat is detachably supported. In this configuration, the combination provides a boat and trailer assemblage which may be employed as a mobile living enclosure on land and which is adapted to be readily transported from one location to another by a conventional motor vehicle such as a truck or passenger automobile. The trailer unit may incorporate conventional equipment generally found on a typical boat trailer, for example, which may be represented by easily disengaged attachment fixtures to secure the boat hull to the frame, a forward-mounted winch and cable arrangement and transverse rollers which support the hull and which, together with the winch and cable, make it possible to move the hull longitudinally "off" and "on" from and to the trailer at a typical boat launching ramp.

The trailer unit 11 is illustrated as comprising a basic trailer frame 12 having a set of tandem wheels 13 and 14. A fender or wheel guard 15 projects outwardly from each of the opposite sides of the frame so as to provide a covering for the wheels 13 and 14. Although the major weight of the boat and trailer assemblage is borne by the wheels 13 and 14, a stabilizer 16 is provided at one end of the frame having a ground engaging wheel for supporting the frame when the assemblage is not to be towed. A trailer hitch 17 may be provided adjacent the stabilizer 16 which is suitable to be readily connected with and disconnected from a ball portion (not shown) of a trailer hitch normally carried by the towing vehicle. If desired, a butane tank 18 may be provided. It is to be particularly noted that inasmuch as the trailer unit 11 is not intended to be submerged in the water in combination with the boat 10, equipment and accessories carried directly on the trailer, such as the winch, butane tank, stabilizer, etc. need not be recessed into any portion of the boat and do not have to be of any special or particular design so as to be watertight or specially configured to reduce hydrodynamic drag.

In general, the boat 10 includes a hull 20 having an enclosed cabin 21 consisting of a roof 22, lateral windows 23 and a forward window 24. The hull of the boat is substantially conventional having a tapered bow 25 and an aft portion 26 terminating in a rearmost transom 27 which defines the back of a cockpit area constituting a confined open deck in which to accommodate occupants of the boat. An elongated bumper 28 is provided which extends along the aft portion of the boat hull.

The aft portion 26 includes lateral spaced apart upper edge marginal regions 30 which extend from the rearmost edge of the roof 22 rearwardly to the topmost edge of the transom 27. When it is desired to separate the boat 10 from the trailer 11, and to operate the boat as a separate unit, a power plant in the form of an outboard motor 33 may be detachably connected to the transom 27 so that the boat may be operated in a normal manner. However, a small covered inboard power plant may be provided, if desired.

Referring now to FIGURES 1 and 2, it can be seen that the boat 10 includes a movable flying bridge as indicated by the numeral 31 which is readily adapted to be located into one of two positions. As shown in FIGURE 1, the flying bridge 31 has been pivoted along a transverse axis formed by a hinge 32 into its rearmost position wherein the cockpit area is completely enclosed.

To achieve complete enclosure, it is to be noted that the upper edge 30 of the hull directly corresponds to the contour of the upper and rearmost edges of the flying bridge. The flying bridge is secured in a closed position where it forms and completes the rear portion of the living enclosure by extending the cabin roof line to the end of the boat. The flying bridge in this position provides rear windows 34 and side windows 35 for light into and observation from within the cockpit. Preferably, sealing means are provided either along the top and rearwardly extending edges of the flying bridge or in the edge marginal regions 30 so as to maintain the cockpit substantially watertight when the flying bridge is closed. It may be desirable to employ a securement means in the form of a latch for releasably securing the flying bridge in its rearmost position.

A primary feature of the present invention includes the provision of a door in the side of the boat hull 20 as indicated by numeral 36. The door is a full sized watertight door which permits ingress and egress to and from the interior of the cabin 21 when the assemblage is used as a conventional travel or mobile trailer such as is shown in FIGURE 1. Preferably, the door 36 includes a watertight window 37 and the frame 12 of trailer 11 is provided with an outwardly projecting step 38 immediately forward of the fender 15 which is in alignment with the door 36 so that a person may readily employ the step 38 when going in and out of the doorway. A suitable sealing means 40 is provided about the periphery of the door 36 when closed so that a watertight arrangement is produced. Such a sealing means may take the form of a bulbous type linear seal or other conventional type sealing means may be employed. Obviously, the use of the door 36 is not recommended when the boat unit of the assemblage is waterborne such as shown in FIGURE 2.

Referring now in detail to FIGURE 2, the flying bridge 31 is pivoted to its forward flying bridge position as illustrated in solid lines from the cockpit enclosure position as illustrated in broken lines. When so moved, the flying bridge permits the cockpit immediately to the rear of the cabin to be open and exposed in a manner similar to conventional pleasure boats. In this position, the flying bridge may be releasably secured by means of a suitable quick-release fastener so as to lock the flying bridge in the extended forward position.

Referring now to FIGURE 3, it can be seen that the flying bridge 31 includes lateral members 41 and 42 which are arranged in fixed spaced apart relationship on a base 43 which extends substantially across the width of the boat. The lateral sections 41 and 42 are open at the top and rear when the flying bridge is in its forward position and are closed in its forward location by means of the base 43 and the windshield 34 which may be either panelled as illustrated, or may take the form of a continuous window pane or shield. The base 43 is adapted to rest on top of the cabin roof 22 when the flying bridge is in its forward position and further includes a panel 44 which comprises a portion of the base 43 which is adapted to pivot about an axis normal to the hinge axis 32 so as to provide an opening into a pilot's station in which the conventional boat controls are located. However, when the flying bridge is moved to its rearmost position to enclose the cockpit, the panel 44 is pivoted to close the opening and is secured in its closed position by a suitable spring bias fastener. Furthermore, in order to close the pilot's station when the flying bridge is in its rear position, a second sliding panel 45 is provided which moves out from beneath the roof 22 to occupy the opening immediately leading to the pilot's station which was formerly occupied by the panel 44. In this manner, when the flying bridge is in its rearmost position, a complete and overall roof is provided which entirely encloses the living quarters as well as the cockpit area of the boat.

Referring now to FIGURES 4 and 5, another embodiment of the present invention is shown which includes a substantially U-shaped sliding mount 50 having a transverse member 51 adapted to extend substantially across the width of the boat and downwardly depending side sections which are slidably mounted in tracks carried on the opposite sides of the hull such as is represented by a track 52 on the starboard side of the hull. The sliding mount is adapted to straddle the cabin 21 when located in its forward position. Tracks 52 extend forwardly external of the cabin 21 and rearwardly along the uppermost edge 53 of the hull aft portion 26.

Mounted on the upper rear edge of the slidable mount 50, there is provided a movable flying bridge 54 having a panelled windshield 55 and side windows 56. The pivot connection takes the form of a hinge 57, shown more clearly in FIGURE 5, which permits the flying bridge 54 to assume a forward position as shown in solid lines or a rearmost position as shown in FIGURE 4 which effectively seals off the rear opening to the cockpit of the boat.

It can be seen in FIGURE 5 that the slidable mount 50 may be moved into its forward position as illustrated in solid lines and that the flying bridge 54 may be rotated upwardly and forwardly so as to be seated on the transverse member 51. In this position, the flying bridge may be suitably secured by conventional fastening means and the area to the rear of the flying bridge and cabin remains open for accommodation of the boat's pilot. The controls are readily available to the pilot and, if desired, a panel similar to the panel 44 may be incorporated into a base member 58 to which the windshield and side windows are uprightly mounted. In the open cockpit position, the base member 58 rests on the transverse member 51, while in the closed position as shown in broken lines, the base member 58 is coextensive with the transverse member 51 so as to complete the roof line with the roof 22 of the cabin 21. Suitable seals are provided at abutment points and along all pivot axes so that the living enclosure is watertight.

In view of the foregoing, it can be seen that a novel convertible housing structure is provided which comprises an assemblage for use on land as a mobile trailer comprising a boat and a trailer. When operated as a roadable assemblage, the flying bridge 31 is in its closed position as shown in FIGURE 1 and access to the interior of the cabin 21 is had by means of the door 36. However, when it is desired to employ the housing as a conventional boat, the boat is removed from the trailer assemblage and placed in the water with the flying bridge 31 rotated to its forward position as shown in FIGURE 2 so that the cockpit is open. The watertight door 36 prevents water from entering the interior of the hull. Maximum interior living and storage space is provided and the overall silhouette is comparatively low when considering conventional houseboat design.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A housing structure assemblage adapted to be employed as a mobile living shelter on land and to be employed as a water vehicle when disassembled comprising:
   a waterworthy living unit including a hull, an enclosed cabin, parallel sides and a transom defining an open cockpit immediately aft of said cabin;
   a wheeled trailer unit for movably supporting said living unit including means for detachably mounting said hull to said trailer unit; and
   a flying bridge structure pivotally carried on the rearmost edge of the roof of said cabin adapted to be positioned so as to selectively enclose said hull cockpit so that a living enclosure is produced in cooperation with said sides, transom and cabin.

2. The invention as defined in claim 1 wherein said hull includes a watertight door disposed on a selected side of said cabin operable to allow ingress and egress therethrough when said living unit is mounted on said wheeled trailer.

3. The invention as defined in claim 2 wherein said wheeled trailer includes a frame and foot step carried thereon outwardly projecting at a predetermined location immediately beneath said lateral cabin door so as to facilitate entering and leaving said cabin via said door.

4. The invention as defined in claim 1 wherein said living unit constitutes a pleasure boat and said flying bridge includes a transverse windshield and a pair of spaced apart lateral windows fixedly carried on a base member wherein said base member rests on the roof of said cabin when said cockpit is open and said base member is coextensive with the roof line of said cabin when said cockpit is enclosed.

5. The invention as defined in claim 4 wherein the uppermost edges of said windshield and said lateral windows matingly engage with the edge marginal regions of said hull transom and sides respectively to completely enclose said hull cockpit.

6. In a pleasure boat having a hull, a forward cabin and sides extending aft from said cabin terminating in a transverse transom to define an open cockpit, the combination which comprises:
  a flying bridge windshield arrangement movably mounted on said cabin and adapted to be selectively moved to a first position over the roof of said cabin so as to operate as a wind and spray protector for the boat's pilot and adapted to be selectively moved to a second position aft of said cabin to enclose said cockpit so as to cooperate with said cabin to provide a composite living enclosure.

7. The invention as defined in claim 6 wherein said flying bridge includes a base member having a transverse edge pivotally connected to the rearmost edge of the roof of said cabin and which is adapted to rest on the roof of said cabin when said flying bridge is in its first position and adapted to be coextensive with the roof of said cabin when said flying bridge is in its second position.

8. The invention as defined in claim 7 wherein said base member includes a movable panel having a hinge axis normal to the hinge axis of said pivotal connection of said base member with said cabin and which is adapted to pivot to a position resting on said base member to effectively gain access to the pilot's boat controls when said flying bridge is in its first position.

9. The invention as defined in claim 6 including a U shaped mount straddling the aft portion of said cabin in sliding relationship therewith so as to be positionable aft of said cabin:
  track means secured to the opposite sides of said hull for slidably supporting said mount; and
  hinge means pivotally connecting said flying bridge arrangement to the rearmost transverse edge of said mount.

10. The invention as defined in claim 6 including a wheeled trailer detachably coupled to said hull serving as an undercarriage for said boat whereby said boat and said trailer constitute a mobile living structure for use on land.

11. The invention as defined in claim 10 wherein said hull includes a watertight door mounted on the side of said cabin to allow ingress and egress to said cabin when said boat and trailer assemblage is operated as said mobile living structure.

12. The invention as defined in claim 11 including fastener means for releasably securing said flying bridge arrangement in either of its alternate positions.

13. The invention as defined in claim 12 including sealing means extending along the mating edges of said flying bridge arrangement with said sides and transom of said hull so as to assure a watertight seal when said flying bridge arrangement is in its second position.

References Cited

UNITED STATES PATENTS 3,179,959    4/1965    McDougall _____ 9—1
3,336,612    8/1967    Stevens _____ 9—1

FERGUS S. MIDDLETON, *Primary Examiner.*

T. M. BLIX, *Assistant Examiner.*